Figure 1:
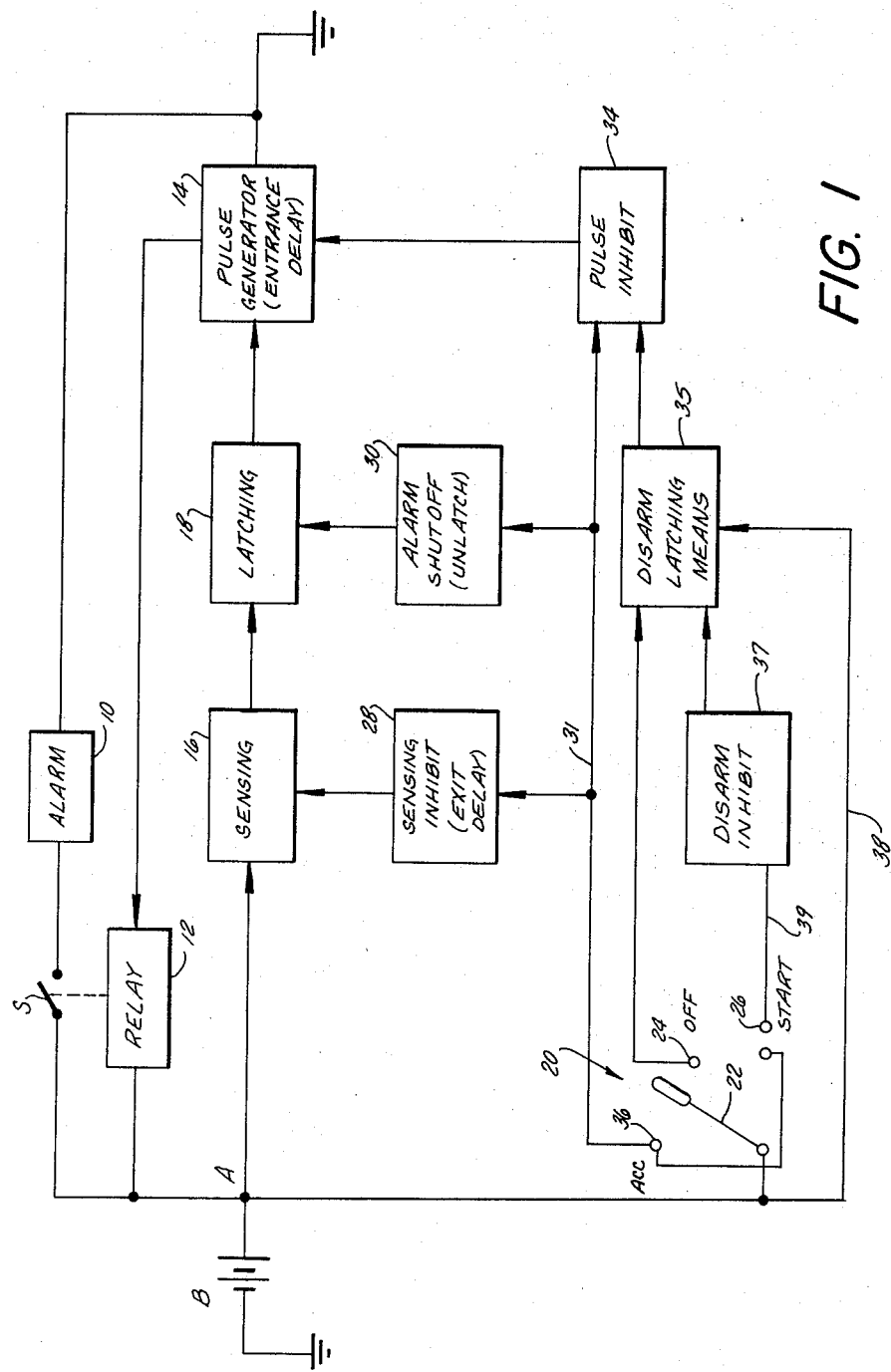

United States Patent [19]
Teich

[11] 3,829,829

[45] Aug. 13, 1974

[54] AUTOMOBILE THEFT ALARM WITH IGNITION CONTROLLED AUTOMATIC ARMING MEANS

[76] Inventor: Rudor M. Teich, 6040 Blvd. E., West New York, N.J. 07093

[22] Filed: Dec. 4, 1972

[21] Appl. No.: 311,939

Related U.S. Application Data

[60] Division of Ser. No. 217,181, Jan. 12, 1972, Pat. No. 3,671,934, which is a continuation-in-part of Ser. No. 86,222, Nov. 2, 1970, Pat. No. 3,740,713.

[52] U.S. Cl. ............................. 340/64, 307/10 AT
[51] Int. Cl. ............................................. B60r 25/10
[58] Field of Search ................. 340/63, 64, 65, 276; 307/10 AT

[56] References Cited
UNITED STATES PATENTS

| | | | |
|---|---|---|---|
| 3,531,793 | 9/1970 | Shottenfeld | 340/276 |
| 3,656,100 | 4/1972 | Beltrami | 340/63 |
| 3,659,266 | 4/1972 | Meyerle | 340/63 X |

*Primary Examiner*—Alvin H. Waring

[57] ABSTRACT

A vehicle alarm system adapted to provide a pulsed actuation of an audible alarm upon unauthorized entry is provided with means to automatically rearm the circuit a predetermined interval after the ignition switch is turned off. The alarm is activated by a pulse generating circuit which is energized by a sensing circuit responsive to the rate of change of voltage at the vehicle battery terminals and is latched in its energized condition until the ignition switch is turned on. Means are provided to render the sensing circuit ineffective while the ignition switch is on and for a predetermined interval after it is turned off to allow the driver sufficient time to exit the vehicle. The pulse generating circuit is provided with an inherent initial time delay to provide the driver sufficient time to enter the vehicle and turn the ignition switch on.

Means are provided for disarming the circuit when the ignition switch is turned to the accessory position and held in such position for a predetermined time interval, failing which the circuit will be automatically rearmed upon turning the ignition off. The practical effectiveness of the system is greatly enhanced by the requirement that the driver take positive action to disarm the alarm.

3 Claims, 2 Drawing Figures

AUTOMOBILE THEFT ALARM WITH IGNITION CONTROLLED AUTOMATIC ARMING MEANS

This is a division of application Ser. No. 217,181 filed Jan. 12, 1972, now U.S. Pat. No. 3,671,934, entitled "Automobile Theft Alarm with Ignition Controlled Automatic Arming Means", which in turn is a continuation in part of my copending application Ser. No. 86,222 filed Nov. 2, 1970, now U.S. Pat. No. 3,740,713, and entitled "Automobile Theft Alarm for Detecting Unauthorized Energization of Resistive Load."

This invention relates to warning systems and more particularly to an automatically armed vehicle alarm circuit controlled by the vehicle ignition switch.

BACKGROUND OF THE INVENTION

The theft of automobiles and of property from parked automobiles represents one of the more significant areas of criminal activity. As the use of automobiles has increased, so has the incidence of thefts involving automobiles. The economic impact of automobile larceny is reflected in part in the increased rates of automobile insurance, and the disproportionate number of automobile accidents involving stolen automobiles in which the unauthorized drivers are often minors. It is also a common practice for thieves to forcibly enter a parked automobile to pilfer articles such as luggage and radios, and in the case of an automobile belonging to a doctor, as indicated by the license plate, medical bags hopefully, in the eyes of the thief, containing narcotics.

The provision of an alarm actuated upon the unauthorized opening of the car door of the automobile, or the operation of any electrically controlled device in the automobile, constitutes an effective deterrent against thefts of this type. The sound of a wailing siren or horn almost certainly upsets the plans of the would-be car thief, and quickly attracts the attention of the police and others.

Alarms of this type have been proposed and are in widespread use on trucks carrying large quantities of goods often having considerable value. The warning alarm, which has as its main object the protection of the goods, generally comprises a plurality of switches which are responsive to the unauthorized opening of doors or the like, and which when actuated, energize a relay to in turn energize a warning device such as a siren. Apparatus of this type requires the installation of a large number of components in the vehicle, such as the switches, relays, etc., and as a result, the cost of purchasing and installing such apparatus is generally high. Owners and operators of trucks are usually willing and able to pay this because the potential saving in insurance premiums, and the increased protection of their customers' products and the accompanying customer good will, make the cost of a warning device of this type well worthwhile.

The acceptance and use of such warning devices by owners of automobiles has, however, been greatly limited, largely as a result of the high initial purchase cost and the difficulty of installation. The known alarm devices adapted for use in automobiles have the further drawback of being not always reliable, and in that the failure of the device often results in the failure of the automobile's electrical system.

More recently, vehicle alarm systems have been developed which are directly responsive to the energization of a load device such as a dome light resulting from unauthorized entry of the vehicle. In some systems, a current sensitive device is interposed between the battery and the load device and is effective upon energization of the load device (by the opening of a door or trunk) to energize a latching relay or switch, thereby to activate the alarm. Systems of this type, while they are somewhat less complex and expensive than the systems mentioned above, nevertheless have several drawbacks. For example, they are difficult to install because the accessory leads must be opened in order to install the one or more current sensitive devices. Moreover, failure of the thus installed current sensing device may produce a failure of one or more load devices or in some cases failure of the entire electrical system of the vehicle.

A second category of system of this type is sensitive to the voltage level at the battery and is adapted to detect unauthorized entry by sensing a voltage dip at the battery terminals resulting from the energization of a load device and is adapted to activate the alarm in response thereto. While these systems are easier to install, they are frequently subject to false alarms. Thus, because the sensing circuit is responsive only to battery voltage magnitude, it will respond to all fluctuations, including those not associated with unauthorized entry. As a result, systems of this type are often activated by such events as nearby radio transmission, extremes of temperature, changes within the battery itself, and even the winding of a conventional automobile clock.

In my aforementioned co-pending application, I disclose a vehicle alarm circuit which is responsive only to the rate of change of voltage at the battery terminals. Accordingly, that circuit discriminates between resistive loads normally associated with unauthorized use of the vehicle and inductive loads resulting from extraneous events. That alarm system, accordingly, represents a substantial improvement over prior art vehicle warning devices in that it combines exceptional reliability at low cost with relatively easy installation.

All known vehicle alarm systems, including my most recent "rate-of-change of battery voltage" sensing system described above, are provided with manually actuated means for arming the alarm, typically in the form of a simple switch. The switch may be accessible from the outside of the vehicle, in which case it is key actuated, or it may be located in a suitable location within the vehicle. In the latter case, time delay means may be provided to allow entrance by the authorized user without activating the alarm. In either case, however, the alarm circuit must be completely deactivated prior to authorized use of the vehicle and will not be effective upon the driver's leaving the vehicle unless reactivated at that time. Stated in other terms, in all prior art vehicle warning systems the choice of arming the alarm circuit is left to the driver. The presumed necessity of this feature has in the past been perhaps the major obstacle to the effectiveness of vehicle alarm systems. Thus, the most sophisticated warning system is completely useless if the driver does not arm it. Consequently, while prior art vehicle alarm systems are today fairly widespread, drivers quite often inadvertently forget to arm them or consciously forego arming in situations in which they (normally unjustifiably) feel the chance of unauthorized entry is minimal. As a result, insurance companies place very little stock in such systems and their widespread use has not been effective in lowering high insurance rates.

It is a primary object of the present invention to provide a vehicle alarm system which is automatically perpetually armed and requires positive action of the driver to disarm it.

It is another object of the invention to design a vehicle alarm system of the type described in which the alarm activating circuit is controlled by the key actuated ignition switch, alarm activation being inhibited only during authorized operation of the vehicle but the circuit being automatically rearmed upon termination of such operation.

It is yet another object of the present invention to provide a vehicle warning system of the type described in which means are provided to activate and deactivate the alarm in pulse fashion upon unauthorized entry, a substantial time delay being provided to allow the driver to deactivate the pulse circuit after authorized entry.

It is still another object of the present invention to provide a vehicle alarm circuit of the type described including means responsive to the ignition switch of the vehicle for automatically arming the circuit a predetermined time after the ignition switch is turned off, thereby to allow sufficient time for the driver to exit the vehicle.

It is yet another object of the present invention to design an electronic vehicle alarm system which utilizes a minimum of standard inexpensive components, is easy to install and is extremely reliable in operation.

To these ends, the present invention comprises a vehicle alarm system having an audible alarm device operatively connected across the battery terminals in series with a relay actuated switch. The alarm device is preferably the vehicle horn and the relay is in turn connected in series with a pulse generator circuit, adapted upon energization to provide a rapid pulse activation of the horn, whereby the sound is readily distinguishable from a stuck horn.

The pulse generator is designed such that a relatively long time delay is provided between energization and the first pulse output, the pulses thereafter being generated rapidly. In a preferred embodiment of the invention, the pulse generator is energized upon a dip in battery potential of a predetermined rate-of-change associated with the energization of a load device resulting from entry to the vehicle, that rate-of-change of potential being sensed by a sensing circuit which in turn triggers a latching circuit for latching the pluse generator in the "on" condition.

The sensing and latching circuits are substantially identical to that described in my aforementioned copending application Ser. No. 86,222 and comprise an SCR controlled by a sensing transistor operatively connected to the battery terminals. Means are provided for unlatching the SCR when the ignition switch is turned, by means of the ignition key, to the ignition or "start" position. Accordingly, the aforementioned delay provided by the pulse generator circuit provides sufficient time to enable the driver to enter and start the vehicle thereby temporarily disabling the alarm. In addition, means are provided, again responsive to the ignition switch, for inhibiting the sensing transistor when the vehicle is being operated, thereby to prevent momentary alarm actuation in response to the energization of load devices such as lights, cigarette lighter, radio, etc. That inhibiting circuit is provided with means to maintain the sensing circuit insensitive to battery voltage fluctuations for a predetermined time after the ignition switch is turned to the "off" position, thereby to afford an "exit delay" sufficient to allow the driver to leave the vehicle without activating the alarm.

The pulse generating circuit, however, remains armed unless positively disarmed by the driver. For this latter purpose there is provided a pulse inhibit circuit operatively connected to the pulse generator circuit and adapted, upon appropriate energization, to deactivate the triggering transistor thereof. The pulse inhibit circuit comprises a pulse inhibit transistor operatively connected to the pulse trigger transistor and adapted to short out the control terminal thereof. The pulse inhibit transistor is operatively connected in series with the ignition switch and is adapted to be operatively connected to the positive terminal of the battery when the ignition switch is turned to either the "start" or "accessory" position.

A permanent disarming circuit includes an SCR connected in series with the control terminal of the pulse inhibit transistor and adapted to latch that control terminal in the shorted out position in response to the buildup of charge on a capacitor connected to the SCR control terminal. However, that capacitor is connected in parallel with a disarm inhibiting circuit comprising a transistor having its control terminal operatively connected to the positive battery terminal through the ignition switch. When the ignition switch is in the "start" position that transistor is rendered conductive thereby shorting out the disarm capacitor and preventing the activation of the latching SCR. Accordingly, when the ignition is turned off, the pulse inhibit transistor returns to its off condition and the pulse generator circuit is again armed. If, on the other hand, the ignition switch is turned to the accessory position, the above mentioned capacitor shorting transistor remains nonconductive and charge builds up on the disarm capacitor. Upon turning off the ignition switch, the SCR is activated and is effective to latchingly connect the control terminal of the pulse inhibit transistor to the positive battery terminal, thereby disarming the circuit. The length of time sufficient to charge the disarm capacitor is sufficient to prevent inadvertent disarming in ignition switches where the accessory position is between the start and off positions.

Accordingly, to disarm the alarm circuit the driver must turn the ignition key to the "accessory" position and hold it in that position for a predetermined time (i.e., 5 or 6 seconds). When the ignition switch is again turned to the start position, upon subsequent operation of the vehicle, the disarm capacitor is automatically discharged thereby unlatching the SCR. As a result, the pulse generator will again be rearmed when the ignition is turned off in the manner previously described.

The system herein described is relatively foolproof. The circuit is automatically rearmed each time the driver leaves the vehicle, even if the key is retained in the ignition, provided it is in the off position. Any attempt at unauthorized entry will be thwarted by a loud pulsing of the horn beginning a short time after entry unless the thief has the ignition key and succeeds in turning on the ignition switch within the entrance delay. Even in that case, the alarm will be rearmed as soon as the ignition is again turned off and the alarm will be activated upon exit or (if the thief exits within the exit delay) upon re-entry.

In vehicles where no accessory position of the ignition switch is provided, a separate momentary type disarm switch may be provided in a concealed location. To disarm the circuit the driver must actuate this switch for the required time interval after the ignition is turned off.

Figure 2:
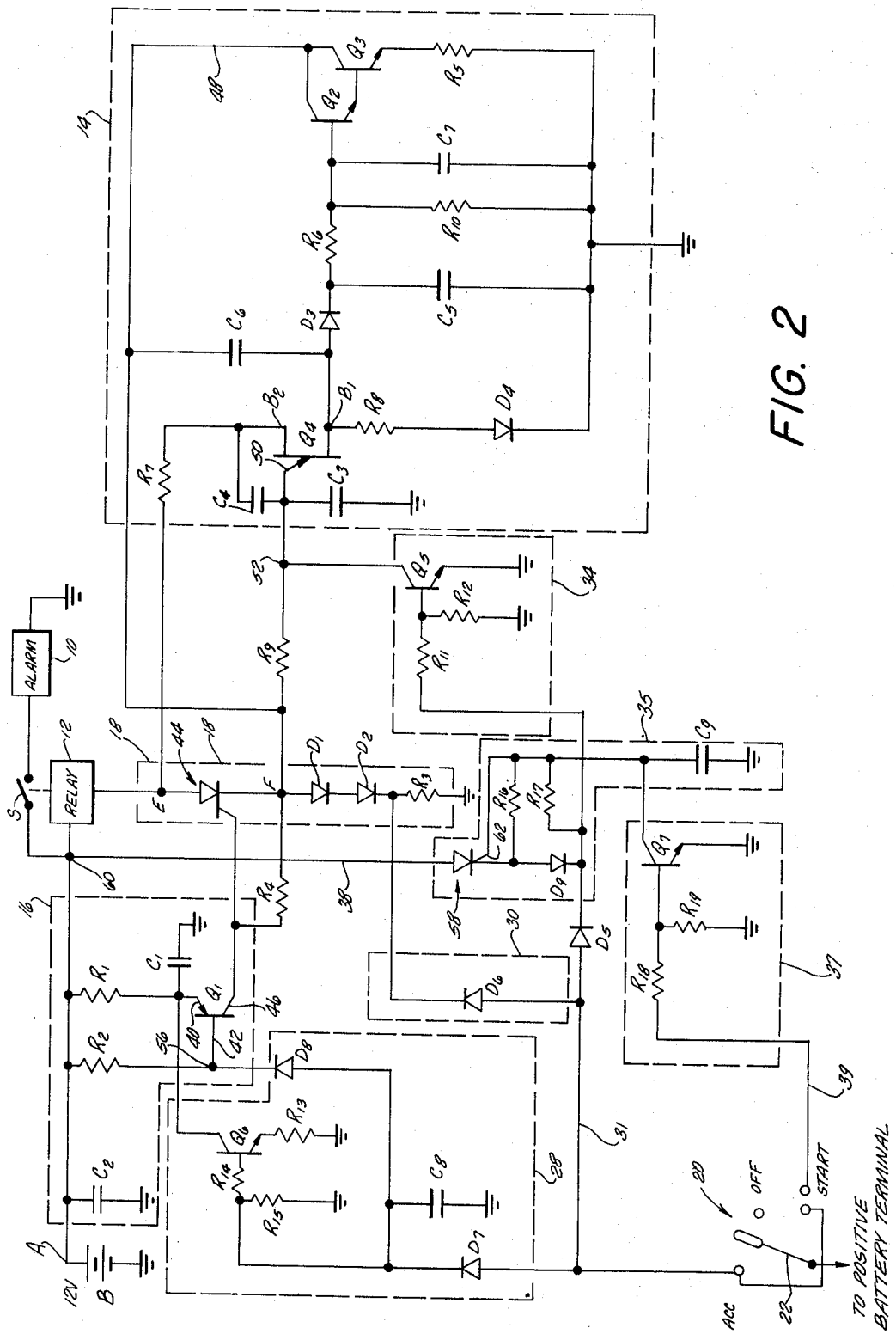

To the accomplishment of the above and to such other objects as may hereinafter appear, the present invention relates to a vehicle warning system and an ignition control therefor as defined in the appended claims and as described in the specification taken together with the accompanying drawings, in which:

FIG. 1 is a schematic block diagram showing the operation of the alarm circuit of the present invention; and FIG. 2 is a detailed circuit diagram showing the entire alarm circuit and the interconnection of the various electrical components thereof.

The functional operation of the alarm circuit of the present invention is best illustrated in the schematic block diagram of FIG. 1. As there shown, an alarm device generally designated 10 is connected between the positive battery terminal and ground in series with a relay actuated switch S. The alarm may be any audible device (such as a siren) adapted upon the application of a voltage thereacross to produce a sound sufficient to draw attention to the vehicle, but is preferably the horn already installed in the vehicle. Switch S is actuated by a relay 12 of a conventional type, the coil of relay 12 energizing the relay upon the flow of sufficient current therethrough. The coil of relay 12 is in turn connected in series with a pulse generator circuit generally designated 14 between the positive battery terminal and ground.

The pulse generating circuit 14 is adapted upon energization to provide a large pulsed current to relay 12 thereby to rapidly open and close switch S to provide a rapid pulsing of alarm 10. The use of a pulse generator insures that when the horn is used as the warning signal it is not mistaken for a stuck horn. In addition, as explained hereinafter in more detail, the pulse generator circuit is designed with an inherent initial time delay (much longer than the steady state pulse width) between its energization resulting from unauthorized entry and the first pulse output.

Pulse generating circuit 14 is energized by sensing and latching circuits generally designated 16 and 18, respectively, those circuits being operatively connected to the positive battery terminal and adapted to latch pulse generating circuit 14 in the "on" condition upon the sensing of a voltage dip at the battery having a rate-of-change of voltage (or rise time) of predetermined value. Sensing and latching circuits 16 and 18 are substantially identical to those described in my aforementioned co-pending application Serial No. 86,222, the sensing circuit 16 being extremely sensitive to the rate of change of voltage at the positive battery terminal. As explained in that application, such voltage dips are normally associated with the energization of a resistive load device within the electrical system of the vehicle (such as a dome light, trunk light, etc.) which is in turn associated with unauthorized entry of the vehicle. Accordingly, as thus far described the circuit is armed and will respond to unauthorized entry with a loud pulsating actuation of the horn a predetermined time interval after such entry occurs.

Control of the aforementioned circuit by the driver or other authorized person is afforded by the ignition switch of the vehicle generally designated 20 operatively connected to the positive battery terminal and having a switch contact 22. As illustrated, in the "off" position 24 of the ignition switch, the circuit described above remains armed and responsive to the rate-of-change of voltage at the positive battery terminal. However, as the ignition switch is turned by means of the appropriate key to the start position 26 or the accessory position 36, the ignition switch 22 is adapted to connect the accessory line 31 to the battery thereby to operatively connect a sensing inhibit circuit generally designated 28 to the battery to energize that circuit 28. Sensing inhibit circuit 28 is in turn operatively connected to sensing circuit 16 and, upon energization, is adapted to render circuit 16 insensitive to the rate-of-change of voltage at the positive battery terminal. In addition, switch contact 22 in the start or accessory position operatively connects an alarm shut off circuit generally designated 30 to the battery B, that shut off circuit being operatively connected to latching circuit 18 and adapted upon energization by the battery B to unlatch that circuit thereby returning pulse generating circuit 14 to its off condition. Accordingly, if the ignition switch is turned to the start or accessory position within the initial time delay provided by pulse generator 14, prior to activation of the horn or other audible alarm 10, the alarm will not be activated in response to the entry of the vehicle and subsequent energization of load devices within the vehicle (i.e., radio, lights, etc.) will not be sensed by sensing circuit 16 during normal operation.

Pulse generator circuit 14 is further connected to an alarm disabling circuit generally comprising a pulse inhibit circuit 34 connected to the ignition switch 20 via accessory line 31 and adapted to be energized by the battery B when that switch is in the start or accessory position. The pulse inhibit circuit 34 is in turn operatively connected to pulse generator circuit 14 and adapted upon energization to completely short out the pulse generating circuit 14. A disarm circuit 35 is in turn operatively connected between the battery B and the accessory line 31 and is provided with a latching means adapted to latchingly connect the pulse inhibit circuit 34 to the battery B via lead line 38 provided for that purpose. That disarm latching means is activated when the ignition switch is turned from the accessory to the off position provided it has been maintained in the accessory position for a predetermined interval. Accordingly, when the ignition switch 20 is turned to the accessory position and held there for a period exceeding that interval, pulse inhibit circuit 34 is latchingly connected to the battery after the ignition switch is turned to the off position 24 and remains energized thereby to disable the pulse generator circuit 14, whereby the alarm circuit is disarmed. However, in the start position 26 of ignition switch 20, disarm circuit 35 is inhibited from the aforementioned latching operation by means of an inhibit circuit generally designated 37 operatively connected to the battery B via lead line 39 in the start position of the ignition switch. Accordingly, when the operator switches the ignition off after operating the vehicle in the start position of the switch, sensing inhibit circuit 28 and alarm shut off circuit 30 and pulse inhibit circuit 34 are all simultaneously disconnected from the battery and the circuit is again armed. In order to afford the driver or other authorized user an opportunity to exit the vehicle without activating the alarm, sensing inhibit circuit 28 is also provided with a terminal delay and continues to render sensing circuit 16 insensitive to voltage variations at the battery for that predetermined exit delay after the ignition is turned off.

The various subcircuits will now be described in detail with reference to the circuit diagram of FIG. 2. As previously noted, the sensing and latching circuits 16 and 18 are described in detail in my co-pending application Serial No. 86,222. Briefly, sensing circuit 16 comprises a transistor Q1 having its emitter terminal 40 connected to the positive battery terminal through a resistor R1 and its base 42 connected to the positive battery terminal via a resistor R2. A capacitor C1 is operatively connected between the emitter 40 of transistor Q1 and ground thereby forming an RC network with resistor R1. The capacitor C1 charges up to substantially the full battery potential within seconds after the network is operatively connected. At room temperature the base voltage of transistor Q1 must be approximately 0.6 volts below the voltage at the emitter terminal for conduction to occur. Under normal conditions, when the circuit is armed and operating, the base and emitter voltages are thus equal to substantially the full battery potential. As a result, the transistor Q1 is back biased by approximately 600 millivolts. When a sharp voltage drop appears at the positive battery terminal A (such as would result from the energization of a resistive load across the battery terminals), it travels through resistor R2 and appears substantially instantaneously at the base terminal 42 of transistor Q1. However, the appearance of that negative going pulse at the emitter terminal 40 of transistor Q1 is delayed by the RC network comprising resistor R1 and capacitor C1. As a result, if the pulse is of sufficient magnitude and sharpness, transistor Q1 will be rendered conductive thereby to energize the latching circuit 18.

That circuit comprises an SCR 44 operatively connected in series with relay 12 and having its control terminal operatively connected to the collector 46 of transistor Q1. Upon conduction of transistor Q1 in response to a negative going pulse at the positive battery terminal A, capacitor C1 is discharged through transistor Q1 and appears as a positive going pulse at the gating terminal of SCR 44 thereby to trigger that SCR into conduction. The path from the positive battery terminal A through the relay 12 and SCR 44 to ground includes diodes D1 and D2 and a resistor R3. The value of resistor R3 is selected to allow a latching current through SCR 44 in excess of the worst case holding-current requirement. It will be appreciated, however, that this current is far below that required to actuate relay 12. Resistor R1 is selected to provide a time constant in the RC network short enough to discharge capacitor C1 in response to any negative going pulse having a rise rate which is not above a predetermined value. A second capacitor C2 is operatively connected across the battery terminals and serves as a low pass filter adapted to shunt spurious noise. A resistor R4 is connected between the collector 46 of Q1 and node F at the cathode of SCR 44 and serves as a low impedance load to prevent false triggering.

The triggering of SCR 44 into conduction and the latching thereof is effective to energize the pulse generating circuit 14. That circuit comprises a Darlington amplifier comprising a pair of transistors Q2 and Q3. The collectors of transistors Q2 and Q3 are connected to node F via lead line 48, the emitter of transistor Q2 is connected to the base of transistor Q3 and the emitter of transistor Q3 is connected to ground via resistor R5. When a positive voltage is applied to the base of transistor Q2, the Darlington amplifier is fired to provide a low resistance path from node F to ground, drawing sufficient current to pull in the relay 12. Resistor R5 has a very low resistance value and serves as a negative feedback resistance to limit the current through the circuit in case of an external short.

The base of transistor Q2 is operatively connected to one base B1 of a unijunction transistor Q4 via a diode D3 and a resistor R6, unijunction transistor Q4 being adapted, upon triggering into conduction, to turn the Darlington pair of transistors Q2 and Q3 into saturation. The other base B2 of transistor Q4 is connected to the positive battery terminal via a resistor R7 which is connected to relay 12 at node E. The base B1 is connected to ground via resistor R8 and diode D4 and to node F via a capacitor C6. The emitter 50 of transistor Q4 is connected to node F via a resistor R9. A capacitor C3 is connected between emitter 50 and ground and is in series with a coupling capacitor C4 operatively connected between the base B2 of transistor Q4 and emitter 50.

A capacitor C5 is operatively connected between the cathode of diode D3 and ground and is adapted to be charged up to a value exceeding the firing voltage of the Darlington amplifier upon the conduction of unijunction transistor Q4. A resistor R10 is connected between the base of transistor Q2 and ground and provides together with resistor R6 a voltage division action to fire the Darlington amplifier.

When the circuit is armed and in standby condition, the voltage at node F is substantially zero, transistor Q1 and SCR 44 being in the off mode. Accordingly, the unijunction transistor Q4 is also nonconductive, the voltage at its emitter 50 also being substantially zero. However, as a result of the quiescent current flowing through relay 12, resistor R7, transistor Q4, resistor R8 and diode D4, the voltage at base B2 is approximately 9 volts (assuming 12 volts at the positive battery terminal A). As a result, the voltage across coupling capacitor C4 is approximately 9 volts.

When sensing transistor Q1 is momentarily turned on in response to a sharp dip in battery voltage at point A, as previously described, the SCR 44 is triggered and current flows from point A through relay 12, SCR 44 to node F and thence to ground via resistor R3 and to emitter 50 (capacitors C3 and C4) via resistors R9. As a result of the very low internal resistance of relay 12 relative to resistors R3 and R9, node F jumps to approximately 11 volts. In addition, capacitor C4 is discharged by approximately 1 volt bringing base B2 to approximately 10 volts. Capacitors C3 and C4 are now being charged through resistor R9. When the voltage at emitter 50 reaches the firing point of transistor Q4, the emitter-base B1 junction becomes conductive and capacitor C3 immediately discharges through transistor Q4 and diode D3 into capacitor C5. The firing voltage of transistor Q4 is slightly less than the quiescent voltage at its base B2. Thus, in the preferred embodiment the firing voltage of transistor Q4 is approximately 8 volts. Accordingly, the voltage across capacitor C4 just prior to firing is approximately 1 volt. As transistor Q4 switches to the conduction mode, the potential difference between bases B1 and B2 drops to approximately 1 volt. As a result, upon firing of transistor Q4 the voltage across capacitor C4 remains approximately 1 volt (the voltage drop across the emitter-base B1 junction being negligible). Capacitor C4 therefore is not discharged.

As charge builds up on capacitor C5, current begins to flow through resistors R6 and R10 to ground. Capacitor C5 preferably has a capacitance approximately one-fifth that of capacitor C3 and accordingly is charged to approximately substantially the full firing voltage of transistor Q4. Resistors R6 and R10 are sized to provide a voltage at the base of transistor Q2 somewhat greater than the firing voltage of the Darlington pair of transistor Q2 and Q3. Accordingly, the Darlington pair is turned into saturation providing a low resistance path through lead 48 from node F to ground, and the voltage at node F drops to approximately 1 volt, thereby pulling in the relay 12 to activate the switch S and sound the alarm.

The time required to charge capacitors C3 and C4 to the firing voltage of transistor Q4 defines the entrance delay and is preferably at least 6 seconds, thereby to allow sufficient time for the drive to enter the vehicle and turn the ignition switch. Accordingly, resistor R9 is preferably relatively large thereby to provide a small charging curreint to emitter 50.

As the voltage at node F drops in response to conduction through the Darlington pair of transistors Q2 and Q3, the voltage on capacitor C3 drops below the valley voltage of unijunction transistor Q4 and transistor Q4 is turned off. Capacitor C6 insures that transistor Q4 turns fully off at base B2 in response to the drop in voltage at node F. Diode D3 prevents capacitor C5 from discharging through resistor R8. The Darlington Q2, Q3, accordingly remains conductive until capacitor C5 is discharged through resistor R6 sufficiently to bring the voltage at the base of Q2 below saturation. The "on" period of the Darlington defines the pulse width of alarm actuation and is partially determined by the time constant of capacitor C5 and resistor R6.

Upon the discharge of capacitor C5 the Darlington transistors Q2 and Q3 are turned off and the voltage at node F jumps back to 11 volts thereby turning off relay 12 and opening the alarm circuit to deactivate the alarm. In addition, a charging current is established through resistor R5. The voltage at node E immediately returns to 12 volts and the base B2 of transistor Q4 jumps back to 10 volts. That increase in voltage at base B2 is immediately capacitively coupled to emitter terminal 50 via coupling capacitor C4, the voltage coupled to emitter 50 being determined by the voltage division action of capacitors C3 and C4. Thus capacitor C4 serves as a voltage source and together with the charging current through resistor R9 rapidly charges emitter 50 to a value close to the firing voltage of transistor Q4 (8 volts), the remaining emitter current being supplied through resistor R9. As a result, transistor Q4 is fired and a new pulse cycle begins. Capacitor C4 is preferably larger than capacitor C3. Accordingly, the effective time constant for charging capacitor C3 to the firing voltage of Q4 is very small compared to the initial entrance delay required to initiate the alarm. This is because once the voltage acorss capacitor C4 is reduced to 1 volt (from its initial value of nine volts), that capacitor is only slightly charged and discharged during the pulsing of unijunction transistor Q4 and the Darlington transistors Q2 and Q3. For example, if capacitor C4 is five times larger than capacitor C3, the voltage on capacitor C3 almost immediately after the Darlington amplifier is turned off is five-sixths of the voltage at base B2 or approximately the firing voltage of the unijunction transistor Q4.

Diode D4 serves as a low temperature compensator for the Darlington amplifier and an additional capacitor C7 is connected between the base of transistor Q3 and ground and is effective to prevent parasitic oscillations at that terminal.

If the driver enters the vehicle and turns the ignition on within the entrance delay provided by pulse generating circuit 14, that circuit is disabled by means of pulse inhibit circuit 34 which comprises a transistor Q5 having its collector connected to the emitter terminal of unijunction transistor Q4 at node 52 and having its emitter grounded. The base of transistor Q5 is connected to the ignition switch 20 via the accessory line 31, including resistor R11 and diode D5. An additional resistor R12 is connected between the base of transistor Q5 and ground. As the ignition is switched on to either the start or accessory position, the base of transistor Q5 is coupled to the 12 volt battery supply through diode D5 and resistor R11, current flows through diode D5, resistor R11 and resistor R12 and the voltage division action between resistors R11 and R12 is effective to turn transistor Q5 on thereby shunting node 52 to ground to prevent the firing of unijunction transistor Q4. The pulse circuit 14 remains disabled as long as the ignition is on.

In addition, the SCR 44 is unlatched by shut off circuit 30 as soon as the ignition is turned on. Shut off circuit 30 comprises a diode D6 operatively connected between the ignition switch and the cathode of diode D2 and is effective to back bias SCR 44 thereby to unlatch same. Diodes D1 and D2 prevent the flow of current through diode D6 and resistor R9 to the unijunction transistor Q4. Accordingly, upon turning the ignition on, latching circuit 18 and pulse generating circuit 14 are returned to their initial unenergized conditions.

When the ignition is subsequently turned off, the base of transistor Q5 is disconnected from the positive battery supply and current ceases through diode D5 and D6. Accordingly, SCR 44 is again forward biased and transistor Q5 is turned off whereby the pulse circuit is rearmed for activation.

The purpose of an exit delay is to provide the driver sufficient time after turning off the ignition to exit the vehicle without activating the alarm by opening the door. This is achieved by the sensing inhibit circuit 28 which is effective to materially reduce the sensitivity of sensing circuit 16 during normal operation of the vehicle and for a period after the ignition has been turned off. Sensing inhibit circuit 28 comprises a transistor Q6 having its collector operatively connected to the emitter 40 of transistor Q1 and its emitter operatively connected to ground through resistor R13. The base of transistor Q6 is connected to the positive battery terminal through the ignition switch via resistor R14 and diode D7. The cathode of diode D7 is connected to ground through resistor R15, to the base 42 of transistor Q1 through diode D8 and to ground through capacitor C8 connected in parallel with resistor R15. Accordingly, when the ignition is switched on (to the start or accessory position) the positive battery supply voltage is fed through diode D7 and resistor R14 to base of transistor Q6, capacitor C8 being charged to the full battery supply voltage. As a result, transistor Q6 is turned on and resistor R13 is connected in series with resistor R1, the voltage at emitter 40 of transistor Q1 being reduced below the normal 12 volt battery supply level as a result of the current flow through resistor R1, transistor Q6 and resistor R13. The resulting voltage at emitter 40 depends upon the voltage division action between resistors R1 and R13 and is preferably about 9 volts (R13 being larger than R1). Accordingly, the base emitter junction of transistor Q1 is back biased and the transistor is rendered insensitive to voltage fluctuations at the positive battery terminal A.

After the ignition is turned off, capacitor C8, which has been charged to the full positive supply voltage, maintains transistor Q6 conductive until it is discharged through resistor R15. The time constant of capacitor C8 and resistor R15 determines the exit delay after which transistor Q6 is turned off. At that time, emitter 40 of transistor Q1 is returned to the full 12 volt level thereby to reactivate the sensing circuit 16. Diode D8 is effective to prevent initial transients from turning transistor Q1 on immediately upon the ignition being turned off.

As thus far described, the circuit is temporarily disabled during operation of the vehicle and automatically rearmed each time the igntion is turned off. The disarm circuit 35 and disarm inhibit circuit 37 are adapted to provide a means for the authorized driver to disarm the circuit prior to turning the ignition off in the rare cases where such disarming is desirable. Disarm circuit 35 comprises an SCR 58 connected in series with a diode D9 between the positive battery terminal A at node 60 and the cathode of diode D5. The gate terminal 62 of SCR 58 is connected to its cathode through a gate shunting resistor R16, to the cathode of diode D9 through resistor R17 and to the positive plate of a storage capacitor C9, the other plate being grounded. As the ignition switch is turned to the accessory position current flows through diode D5 and resistor R17 charging capacitor C9 to the full battery supply voltage. Consequently, if sufficient time is allowed for capacitor C9 to charge up, when the ignition switch is subsequently turned off capacitor C9 rapidly discharges through the gate 62 of SCR 58 thereby triggering the SCR into conduction. As a result, current flows from the positive battery terminal A through SCR 58, diode D9 and resistors R11 and R12 to ground. That current is larger than the holding current required to latch SCR 58 in the conducting mode. Consequently, SCR 58 continues conducting and supplies current to the base of transistor Q5 maintaining that transistor on thereby to short out node 52 and de-energize the pulse generating circuit 14. As a result, even if SCR 44 is later triggered into conduction by sensing circuit 16 the alarm will not be activated. However, as soon as the ignition switch is turned back to either the accessory or start position, the accessory line 31 is energized and SCR 58 is back biased and will therefore unlatch. As a result, each time the driver turns the ignition on the disarm circuit 35, it is automatically unlatched and must be reactivated by the driver in the manner previously described if he so chooses. Diode D9 protects SCR 58 against gate-cathode reverse voltage breakdown.

When the ignition switch is turned to the start position, 12 volts are also supplied to the accessory line 31 and thus means must be provided to inhibit the disarm circuit 35 when the driver merely starts the ignition for normal operation. That means is constituted by disarm inhibit circuit 37 which comprises a transistor Q7 having its collector terminal operatively connected to the positive plate of capacitor C9 and its emitter grounded. The base of transistor Q7 is connected to the ignition switch 20 via a resistor R18. A second resistor R19 is connected between the base of transistor Q7 and ground. As illustrated, when the switch contact 22 of the ignition switch is turned to the start position, a current flows from the positive battery supply through resistors R18 and R19 to ground thereby turning on transistor Q7 which is operatively connected in parallel with capacitor C9 and accordingly shorts that capacitor to ground. Thus, capacitor C9 is not charged during normal operation of the vehicle and when the ignition is subsequently turned off the disarm circuit 40 is not activated, the base of transistor Q5 being disconnected from the positive supply voltage thereby de-energizing pulse inhibit circuit 34. The time constant of resistor R17 and capacitor C9 determines the minimum time in which the ignition switch must be held in the accessory position in order to latch SCR 58 and thereby activate the disarm circuit. That minimum time is preferably at least 5 seconds. The reason for this feature is twofold. First, in some vehicles the accessory position is between the start and the off positions. Thus each time the ignition is turned off, the contacts simulate an accessory mode for a brief period. Second, some vehicles exhibit "dieseling" when shut off. This occurs when the ignition has been turned off and there is no voltage supplied to the ignition line. However, the accessory line is still being supplied from the alternator as long as the engine is turning. This situation again will simulate an accessory mode and thus could falsely disarm the unit. The resistor R16 in disarm circuit 35 is adapted to prevent high temperature misfiring of SCR 58.

It will be apparent from the foregoing that the present invention provides a vehicle alarm system of vastly improved effectiveness and reliability. The system is virtually foolproof in that the alarm circuit is automatically armed each time the ignition is switched off and temporarily disarmed when the ignition is switched on for normal operation. This extremely desirable feature is achieved effectively and economically through a novel pulse generator circuit provided with an inherent intial entrance delay to provide the driver sufficient time to turn the ignition on prior to the pulsed actuation of the horn. In addition, the sensing and latching circuits are disabled during normal operation of the vehicle to prevent momentary actuation of the alarm.

An effective exit delay is provided by maintaining the sensing circuit inoperative for a given time interval after the ignition is shut off. Finally, a unique disarm circuit is provided which is responsive only to the accessory position of the switch provided that position is maintained for a minimum time interval, after which, upon turning the ignition off the disarm circuit latches the pulse generator circuit in the inoperative or disabled position. By requiring such positive action by the driver to disable the alarm, consistent use of the alarm system is insured. The system utilizes a minimum of standard inexpensive electronic components, is easy to install and is extremely reliable in operation.

While only a single embodiment of the present invention has herein been specifically described, it will be appreciated that many variations may be made therein all within the scope of the present invention as defined by the following claims.

I claim:

1. A control circuit having an output node and a control switch with at least three operative positions, comprising a voltage source, first and second lead lines, said control switch adapted in a first position to connect said voltage source to said first lead line, in a second position to connect said voltage source to said first and second lead lines, and in a third position to disconnect both said first and second lead lines from said voltage source, said output node being operatively connected to said first lead line, first switch means having a control and having its output circuit operatively connected between said voltage source and said first lead line, capacitive storage means operatively connected to said control terminal of said first switch means, means operatively connecting said capacitive storage means to said first lead line whereby said capacitive storage means is charged during a predetermined time interval when said control switch is in said first position, and second switch means having a control terminal and having its output circuit operatively connected to said control terminal of said first switch means in parallel with said capacitive storage means and adapted when closed to shunt said capacitive storage means, said control terminal of said second switch means being operatively connected to said second lead line, thereby preventing said capacitive storage means from being charged when said control switch is in said second position, said first switch means being adapted when said control switch is moved from said first position to said third position after said predetermined interval in said first position, to latchingly connect said output node to said voltage source.

2. The control circuit of claim 1, further comprising a resistor operatively connected between said first lead line and said capacitive storage means whereby said predetermined interval is defined by the time constant of said resistor and said capacitive storage means.

3. The control circuit of claim 1, wherein said output node comprises the input to a disarm circuit for a vehicle alarm system and wherein said control switch comprises the ignition switch of the vehicle, said first position comprising the accessory position, said second position comprising the start position and said third position comprising the off position.

* * * * *